United States Patent

Guilino et al.

[11] Patent Number: 5,920,372
[45] Date of Patent: Jul. 6, 1999

[54] OPHTHALMIC LENS HAVING AN ASTIGMATIC EFFECT

[75] Inventors: Günther Guilino; Herbert Pfeiffer; Helmut Altheimer, all of Munich; Rudolf Barth, Vierkirchen, all of Germany

[73] Assignee: Optische Werke G. Rodenstock, Munich, Germany

[21] Appl. No.: 08/821,344

[22] Filed: Mar. 20, 1997

Related U.S. Application Data

[62] Continuation of application No. 08/609,745, Mar. 1, 1996, abandoned, which is a continuation of application No. 08/290,730, filed as application No. PCT/DE93/01194, Dec. 14, 1993, abandoned.

[30] Foreign Application Priority Data

Dec. 15, 1992 [DE] Germany .............. 42 42 267

[51] Int. Cl.$^6$ ................. G02C 7/06; G02C 7/02
[52] U.S. Cl. .......................... 351/169; 351/176
[58] Field of Search ................ 351/169, 176

[56] References Cited

U.S. PATENT DOCUMENTS

| 4,310,225 | 1/1982 | Davis | 351/176 |
| 4,892,403 | 1/1990 | Merle | 351/168 |
| 5,083,859 | 1/1992 | Jalie | 351/176 |

*Primary Examiner*—Georgia Epps
*Assistant Examiner*—Jordan M. Schwartz
*Attorney, Agent, or Firm*—Antonelli, Terry, Stout & Kraus, LLP

[57] ABSTRACT

An ophthalmic lens in which one surface is provided with at least one region, in which the refracting power is practically constant except for aspherical corrections, and at least one transition region which is adjacent to the region having practically constant surface refracting power, and in which the surface refracting power increases or decreases continuously, and the other surface is provided with an astigmatic effect. The orientation of the surface having an astigmatic effect relative to the surface having continuous refracting power change is dependent on the position of the axis of the astigmatism of the eye. The surface having an astigmatic effect deviates from the toric shape and is independent of the orientation of the surface relative to the surface having continuous refracting power change which is a surface optimized for the axial position of 0°.

8 Claims, 7 Drawing Sheets

| Y' | X'=.00 | X'=2.00 | X'=4.00 | X'=6.00 | X'=8.00 | X'=10.00 | X'=12.00 |
|---|---|---|---|---|---|---|---|
| 24.00 | 1.2130 | 1.2266 | 1.2673 | 1.3352 | 1.4302 | 1.5524 | 1.7019 |
| 22.00 | 1.0119 | 1.0254 | 1.0658 | 1.1332 | 1.2276 | 1.3490 | 1.4975 |
| 20.00 | .8308 | .8442 | .8844 | .9514 | 1.0452 | 1.1659 | 1.3136 |
| 18.00 | .6691 | .6824 | .7224 | .7890 | .8823 | 1.0024 | 1.1493 |
| 16.00 | .5260 | .5392 | .5790 | .6454 | .7382 | .8578 | 1.0040 |
| 14.00 | .4009 | .4141 | .4538 | .5198 | .6123 | .7314 | .8770 |
| 12.00 | .2934 | .3066 | .3461 | .4119 | .5041 | .6228 | .7680 |
| 10.00 | .2031 | .2163 | .2556 | .3213 | .4132 | .5315 | .6763 |
| 8.00 | .1297 | .1428 | .1820 | .2475 | .3393 | .4573 | .6018 |
| 6.00 | .0728 | .0859 | .1251 | .1904 | .2820 | .3999 | .5441 |
| 4.00 | .0323 | .0454 | .0845 | .1498 | .2413 | .3590 | .5030 |
| 2.00 | .0081 | .0211 | .0602 | .1255 | .2169 | .3345 | .4785 |
| .00 | .0000 | .0130 | .0522 | .1174 | .2088 | .3264 | .4703 |

| Y' | X'=14.00 | X'=16.00 | X'=18.00 | X'=20.00 | X'=22.00 | X'=24.00 |
|---|---|---|---|---|---|---|
| 24.00 | 1.8788 | 2.0832 | 2.3154 | 2.5755 | 2.8638 | 3.1805 |
| 22.00 | 1.6732 | 1.8764 | 2.1071 | 2.3655 | 2.6519 | 2.9665 |
| 20.00 | 1.4883 | 1.6903 | 1.9197 | 2.1766 | 2.4614 | 2.7741 |
| 18.00 | 1.3232 | 1.5241 | 1.7523 | 2.0080 | 2.2912 | 2.6024 |
| 16.00 | 1.1771 | 1.3771 | 1.6043 | 1.8588 | 2.1408 | 2.4505 |
| 14.00 | 1.0495 | 1.2487 | 1.4750 | 1.7285 | 2.0094 | 2.3178 |
| 12.00 | .9398 | 1.1384 | 1.3640 | 1.6166 | 1.8965 | 2.2039 |
| 10.00 | .8477 | 1.0458 | 1.2707 | 1.5226 | 1.8017 | 2.1083 |
| 8.00 | .7728 | .9704 | 1.1948 | 1.4462 | 1.7247 | 2.0306 |
| 6.00 | .7148 | .9121 | 1.1361 | 1.3871 | 1.6651 | 1.9705 |
| 4.00 | .6735 | .8706 | 1.0944 | 1.3450 | 1.6228 | 1.9279 |
| 2.00 | .6488 | .8458 | 1.0694 | 1.3199 | 1.5975 | 1.9023 |
| .00 | .6406 | .8375 | 1.0611 | 1.3116 | 1.5891 | 1.8939 |

Fig. 3

OPHTHALMIC LENS HAVING AN ASTIGMATIC EFFECT

This application is a Continuation of application Ser. No. 08/609,745, filed Mar. 1, 1996, now abandoned which is a continuation of application Ser. No. 08/290,730, filed Aug. 25, 1994, now abandoned, which is a 371 of PCT/DE93/01194 filed Dec. 14, 1993.

DESCRIPTION

1. Technical Field

The present invention relates to an ophthalmic lens having an astigmatic effect, in which, in addition, the refracting power changes in order to permit vision at varying distances without any or with only negligible accommodation.

2. State of the Art

Progressive ophthalmic lenses, i.e. ophthalmic lenses in which the refracting power steadily rises from a value suitable for distance vision within the corresponding region on the ophthalmic lens via the so-called progression zone to a value suitable for near vision in a corresponding region of the ophthalmic lens have been known for quite some time and are available in a variety of versions. Just by way of example, reference is made to U.S. Pat. No. 2,878,721 or the DE-PS 20 44 639, 28 14 916 and 30 16 935 with regard to the design of the progressive surfaces.

Furthermore, various "special surfaces" are known in which the shape and the arrangement of the regions suitable for certain distance vision have been optimized for special applications, by way of illustration, for work in an aircraft or at a monitor.

These ophthalmic lenses, respectively the correspondingly designed areas of the ophthalmic lens are referred to hereinafter regardless of the number and the arrangement of the individual regions of vision as progressive ophthalmic lenses, respectively as progressive surfaces.

However, if the wearer of the glasses is not only presbyopic, but also has, in addition, a so-called astigmatic aberration (cylindrical aberration) on one or both eyes, it is necessary to additionally provide the respective ophthalmic lens having a progressively increasing effect with an astigmatic effect, respectively a cylindrical effect.

Conventionally this is achieved by the second surface being a toric surface. The second surface is, therefore, referred to as the prescription surface, because the adjustment of the spherical refracting power, of the cylindrical effect and of the cylindrical axis required for correcting the aberration is obtained with it. For compensation of varying axial positions of the cylindrical aberration of the eye, it is necessary to "turn" the axis of the torus accordingly in relation to the progressive surface.

For reasons of fabrication, usually toric surfaces are employed for the surfaces having an astigmatic effect. A toric surface is created by the rotation of a circle about an axis running in the plane of the circle but not through its central point. Both main sections, therefore, are circular in shape, the radii of which vary corresponding to the desired astigmatic effect.

Furthermore, various surfaces having an astigmatic effect have been proposed, in which both main sections have a shape deviating from the circular shape. For this purpose, reference is made to DE-A 18 05 561, EP-A 0 039 498 or the special publication of a lecture by B. Maitenaz in Grenoble of 1969, entitled "Verres progressifs pour aphaques".

In particular, the surface having an astigmatic effect described in EP-A 0039 498 is designed in such a manner that the astigmatism of the ophthalmic lens is supposed to be optimally adjusted not only with regard to the degree but also with the regard to the position of the axis of the eye to be corrected. In other words, this printed publication conveys the principle to calculate a special surface for each cylindrical axis and for each cylindrical effect.

A procedure of this type can still be realized whenever the ophthalmic lens is to solely have an astigmatic effect. However, if the surface having an astigmatic effect is supposed to be combined with a surface having a continuously changing refracting power, the great number of consequently resulting possible combinations of base curves and additions of progressive surfaces having the cyclindrical effects and cylindrical axes of the astigmantic surface would constitute an economically unjustifiable expense for calculating and fabricating an own surface having an astigmatic effect for each progressive surface and each cylindrical effect and axial position.

DESCRIPTION OF THE INVENTION

The object of the present invention is to provide an ophthalmic lens having a progressive and an astigmatic effect, in which, compared to state-of-the-art toric versions, vision correction is achieved for the progressive surface, in particular, having the same design of the distance portion (i.e., base curve having various additions) and a given astigmatic effect, and that independent of the prescribed axial position.

An element of the present invention is that the surface having an astigmatic effect in an, as such, known manner has a design which deviates from the (classical) toric shape. The yielded optimization possibilities permit realizing an ophthalmic lens which is provided with a substantially larger region for distinct vision than progressive ophthalmic lenses having a toric prescription surface.

Furthermore, in the ophthalmic lens designed according to the present invention, the surface having an astigmatic effect utilized as the "prescription surface" is calculated in such a manner that its sections for a specific surface having continuously changing refracting power, i.e., for a specific progressive surface, are optimized for an axial position of 0° independent of the orientation of the surface having an astigmatic effect relative to the surface having continuously refracting power. Strikingly, this procedure yields surfaces which are provided with a region suitable for clear vision even in the 90° position of the "cylindrical axis" relative to the progressive surface as well as all the intermediate positions, this region being substantially enlarged compared to ophthalmic lenses having a toric prescription surface. This is, therefore, especially surprising, because it was actually to be assumed that optimization for an oblique axial position and, in particular, for the axial position of 45° would yield better results than optimization for the axial postion of 0°.

In particular, it has turned out that employing a surface designed in the invented manner having an astigmatic effect, which has been optimized for the axial position of 0°, the region which can be employed for clear vision is negligibly reduced in the axial positions of 45° and of 90° as well as the in intermediate positions compared to ophthalmic lenses in which the astigmatic surface has been optimized for each axial position.

Although a shape deviating from the toric shape can already be realized by the surface in the region between the main sections deviating from the toric shape, the main sections, however, continue to have a circular shape. It is, however, preferable if the surface having an astigmatic effect is provided with at least one main section, the shape of which is not circular.

According to this preferred embodiment, no section of the surface having an astigmatic effect, which runs through the apex, is circular in shape. This yields substantially more optimization leeway compared to an ophthalmic lens in which only a single main section has a shape deviating from the circular shape or in which only the intermediate region between the main sections is varied compared to a toric lens. In particular, the surface having an astigmtic effect can be optimized over a large region of the vision excursion.

Optimization can occur for two viewing cones of which one corresponds to a vision excursion of approximately 15° to 20° and the other corresponds to a vision excursion of approximately 30° to 40° (claim 5).

It is especially preferable if in the combination of a surface having an astigmatic effect selected according to the present invention with a conventionally progessively ophthalmic lens, the refraction deviation, which is defined as $$\delta R = (S'_I + S'_{II})/2 - (sph + \tfrac{1}{2}cyl),$$

remains negative for vision excursions up to 40', whereas in a combination of a conventional progressive surface having a conventional torus with relatively small vision excursions yields positive values for the refraction deviation which cannot be compensated by accommodation.

The invented concept for the astigmatic surface yields progressive ophthalmic lenses, which are provided with large regions suitable for clear vision not only in the distance portion but also in the near portion compared to progressive ophthalmic lenses provided with conventional toric surfaces, in particular, if the planes of both main sections of the surfaces having an astigmatic effect are symmetrical planes, in other words the surface having an astigmatic effect is designed identically in the distance portion and near portion. This permits optimizing the surface having an astigmatic effect taking a counter surface having a practically constant effect as a basis, by way of illustration a spherical surface or an aspherical single-vision lens. The surface utilized in the optimization should be selected in such a manner that its effect corresponds to the effect of a region having practically a constant effect of the surface having a varying surface refracting power, thus by way of illustration, to effect of the distance portion.

Another improvement is obtained if the plane of a main section of the surface having an astigmatic effect is not a symmetrical plane. A design of this type permits weighing the viewing points in the distance and near region more than in the lateral region during the optimization process so that larger regions suitable for distinct vision are yielded without relinquishing the universal applicability of the astigmatic surfaces calculated according to the present invention.

According feature of the present invention is that the viewing points in the distance and near region are taken into consideration individually according to the respective range of vision during optimization along the viewing cones.

BRIEF DESCRIPTION OF THE DRAWINGS

The present invention is made more apparent in the following, by way of example, without the intention of limiting the overall inventive idea using preferred embodiments with reference to the accompanying drawing to which reference is explicitly made with regard to the disclosure of all details not made more apparent herein. Shown are in.

DESCRIPTION OF THE PREFERRED EMBODIMENTS

In the following preferred embodiments, a progressive surface like the ones the Optische Werke G. Rodenstock, 8000 Munich 5 manufactures and sells under the name "Progressiv S" is employed as the progressive surface. In particular, a surface having a "base curve 5" and the "addition 1.0 dpt" is employed. The surface refracting power of this surface in the distance portion is 5.83 dpt if the refraction index is n=1,604. Furthermore, the center thickness of the ophthalmic lens is always $d_M$=04.8 mm.

Figure 1A:
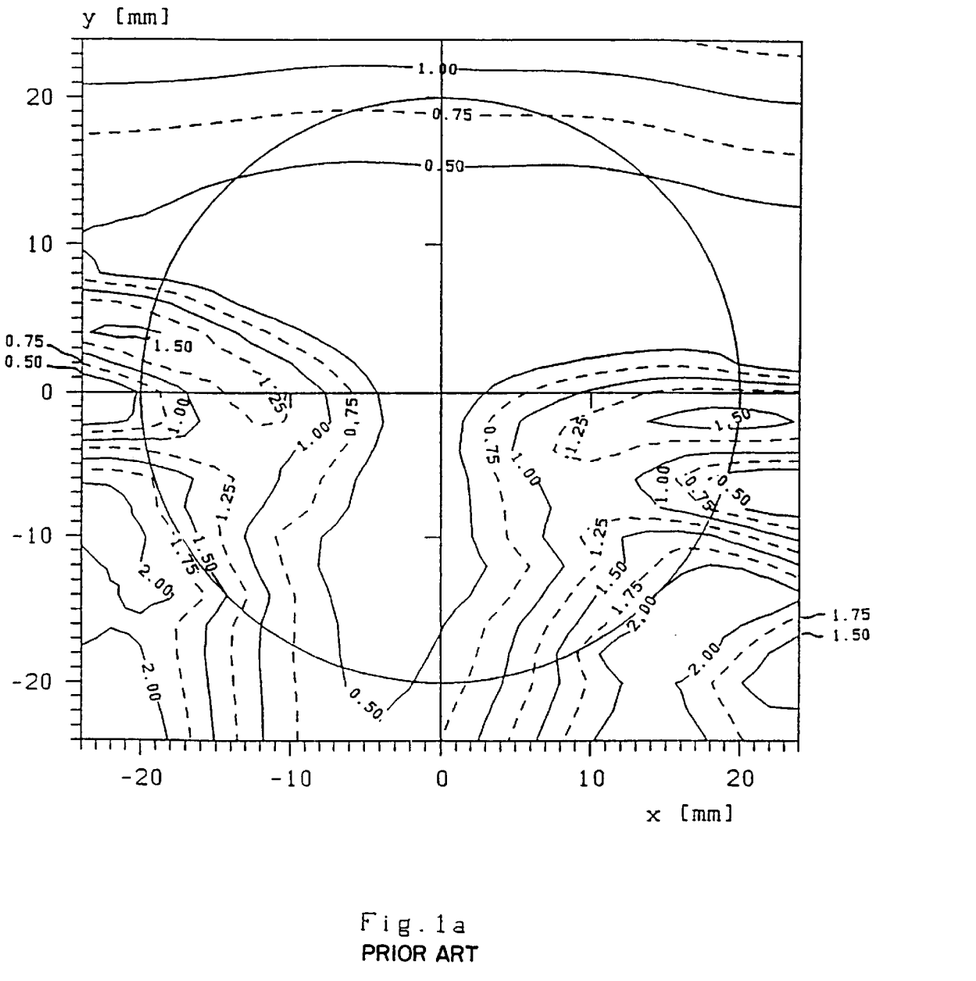
FIGS. 1a–1c the isolines of the astigmatic aberration for the combination of a state of the art progressive lens having a ring-shaped torus for the axial positions of 0°, 45° and 90°, FIGS. 2a–2c the isolines of the astigmatic aberration for the combination of a state of the art progressive surface having a surface designed according to the present invention having an astigmatic effect for axial positions of 0°, 45° and 90°, FIG. 3 the sagittas of the surfaces having an astigmatic effect used in FIG. 2.
Figure 1B:
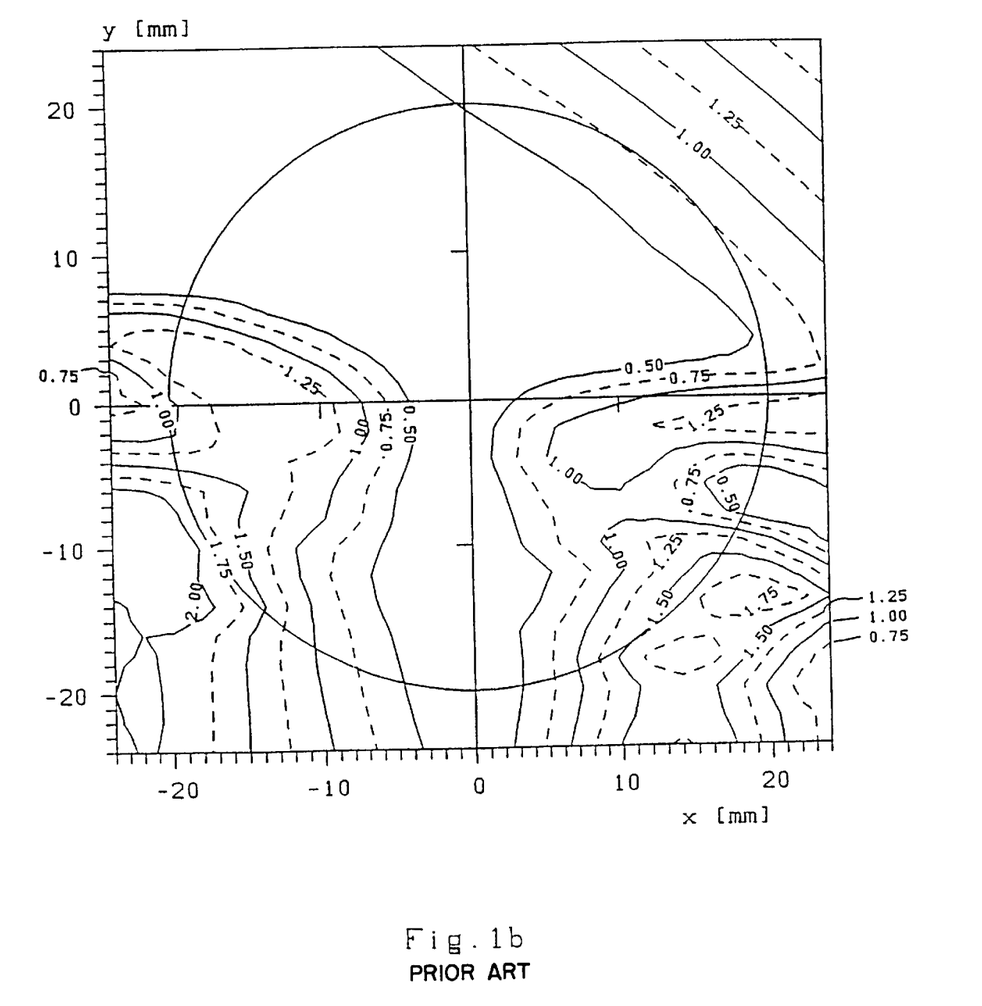
Figure 1C:
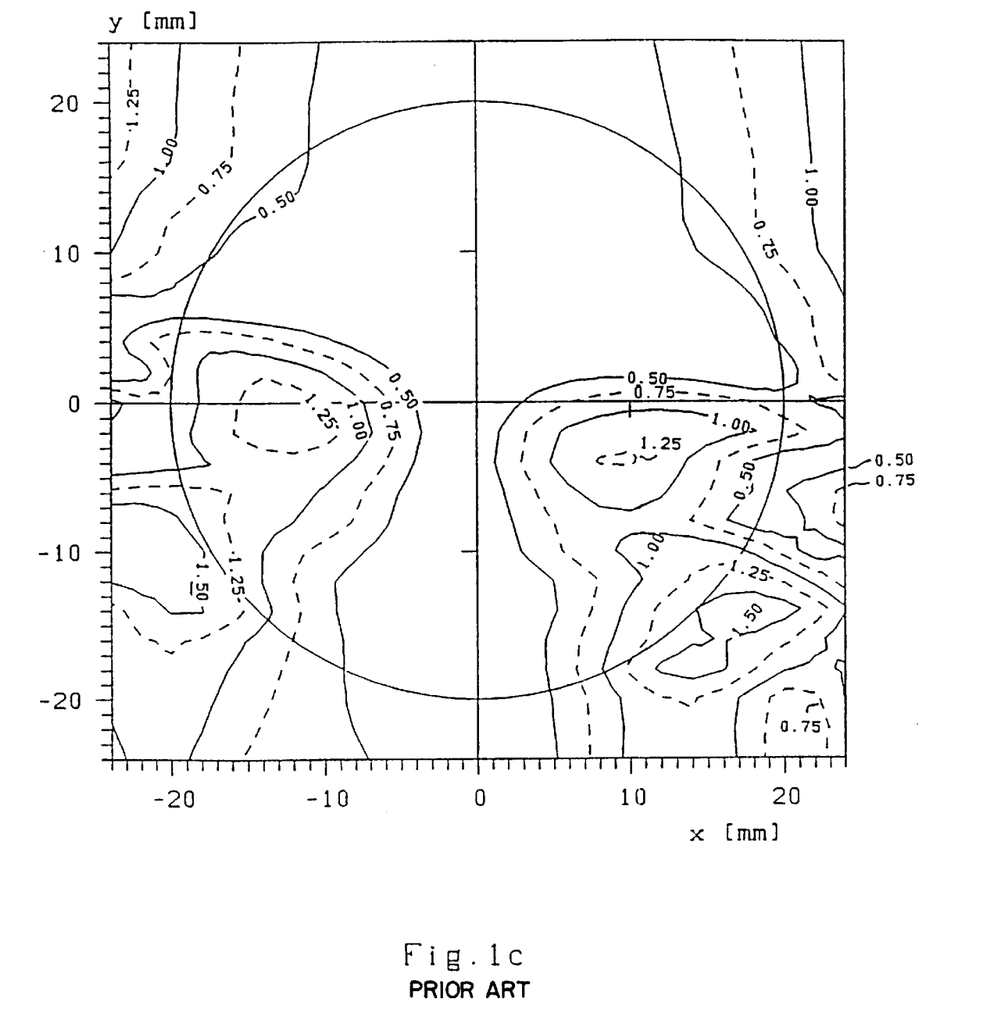
Figure 2A:
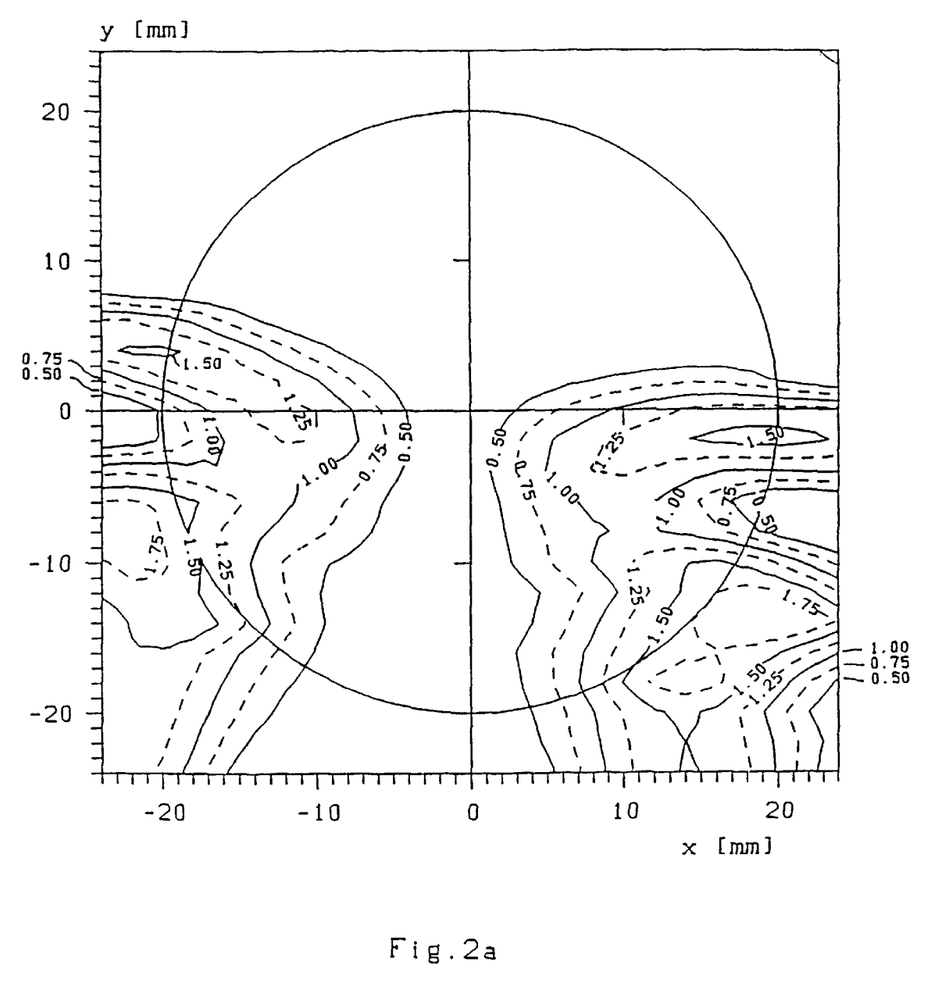
Figure 2B:
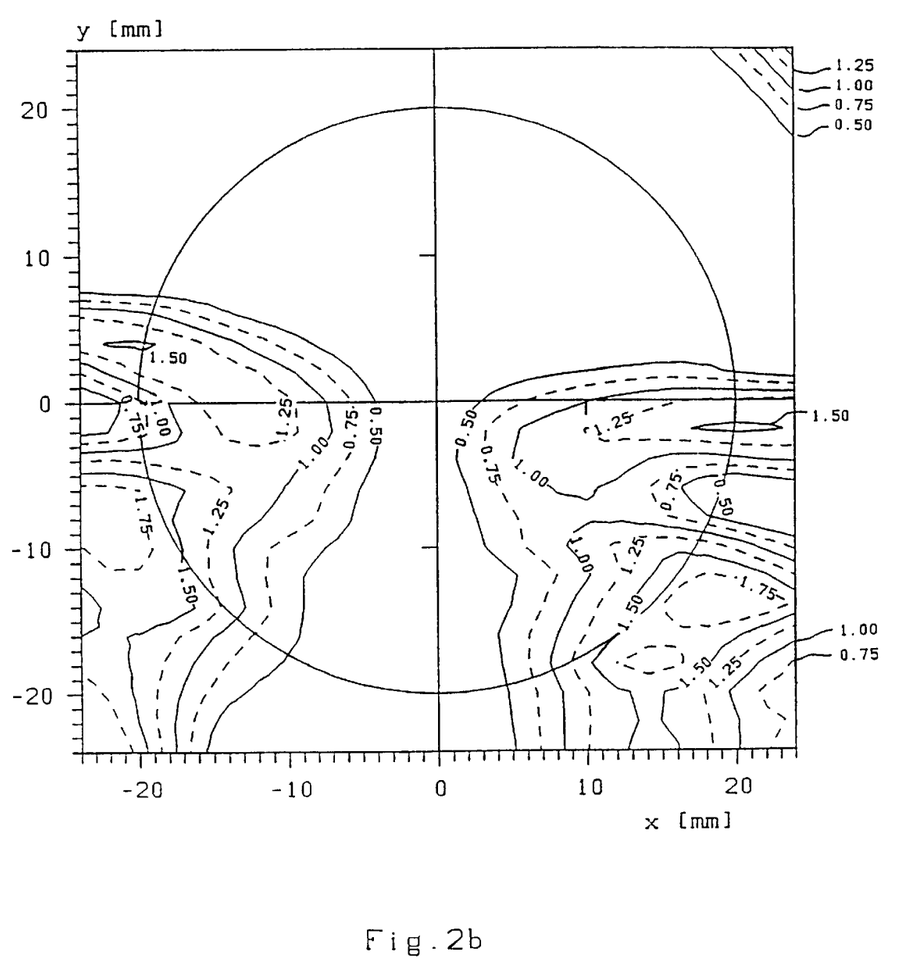
Figure 2C:
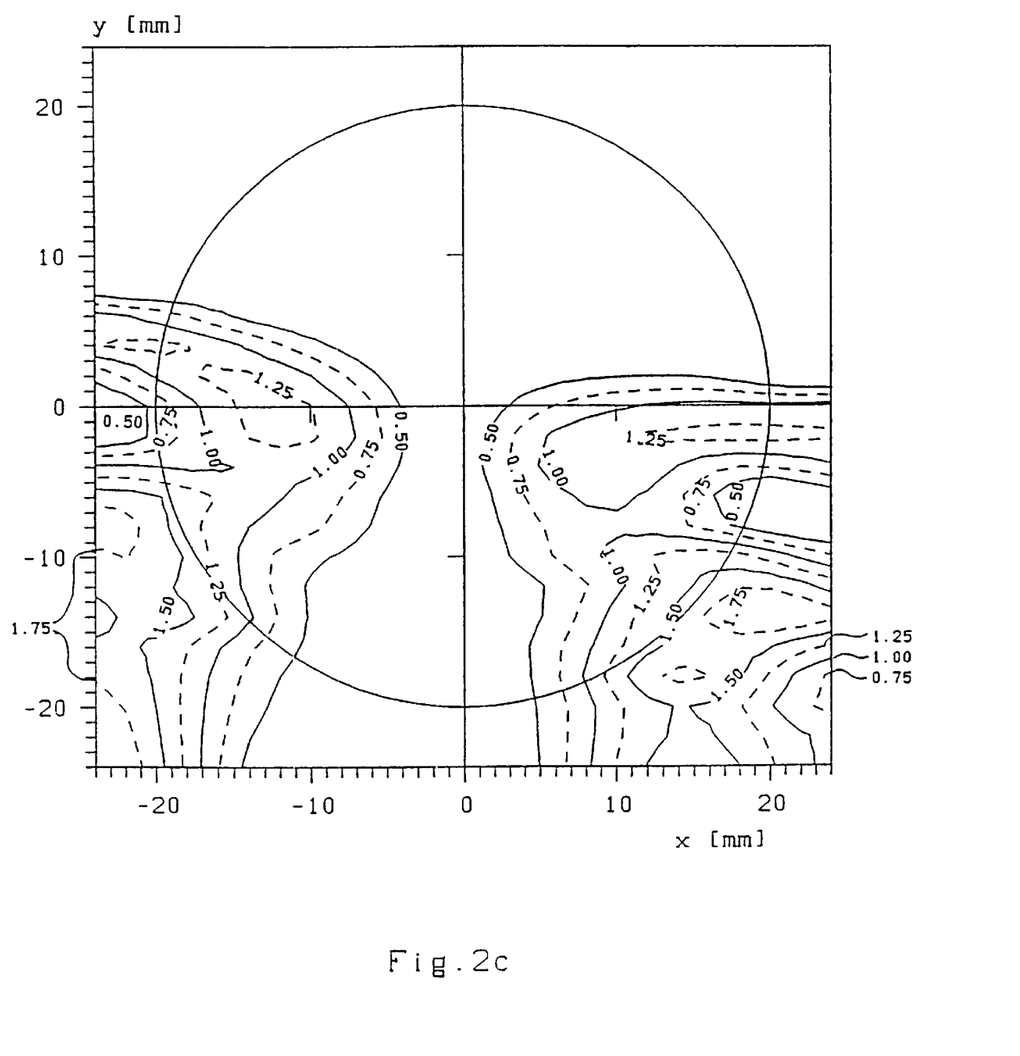

FIGS. 1 and 2 show the astigmatic deviation, i.e., the deviation of the astigmatic effect from the prescribed astigmatic effect in the form of the isolines (lines of the same astigmatic deviation) in plotted in an x/y plane (unit: mm). The coordinates x and y relate to the so-called use position of the ophthalmic lens. In the use position, by way of illustration, when using a symmetrical progressive surface, it is pivoted in a known manner in relation to the verticals in such a way that the main meridian runs toward the nose at an angle of from 8° to 10° in relation to the verticals.

In order to determine the astigmatic deviation from the prescribed value, the "ophthalmic lens/eye" system was examined, i.e. the resulting astigmatic effect was calculated according to the oblique-cross-line-cyclinders method. Furthermore, the validity of the so-called Listing principle for eye rotations is presupposed. Of course, eye rotations can also be reflected using other models.

FIGS. 1a to 1c show the isolines yielded in the use position for the astigmatic aberration for the combination of the aforedescribed progressive surface with a ring-shaped torus, which has a surface refracting power of—2.43 dpt in one main section and a refracting power of—3.93 dpt in the other main section and therefore a cylindrical effect of (approximately) 1.5 dpt.

In particular, FIG. 1a shows the isolines for the axial position of 0°, FIG. 1b the isolines for the axial position of 45° and FIG. 1c the isolines for the axial position of 90°.

FIGS. 2a to 2c show for comparison reasons the isolines of the astigmatic aberration yielded when employing the same progressive surface and an asphere having an astigmatic effect designed according to the present invention. Optimizing the surface having an astigmatic effect is executed for the axial position of 0°, the distance portion effect of the progressive surface and for the distance to the object "infinitely".

As FIGS. 2a to 2c show, an only insignificantly smaller field of vision is also yielded for the axial positions of 45° (FIG. 2b) and of 90° (FIG. 2c) than for the axial position of 0° (FIG. 2a). It is especially noteable that, contrary to when a torus-shaped astigmatic surface is utilized, there is practically no change in the field limited by the isoline 0.5 dpt of the astigmatic aberrations in the distance portion when the astigmatic surface is turned relative to the progressive surface. The change in the field limited by the isoline 0.5 dpt in the near portion is substantially less than the change when utilizing a torus as the astigmatic surface.

Figure 3:
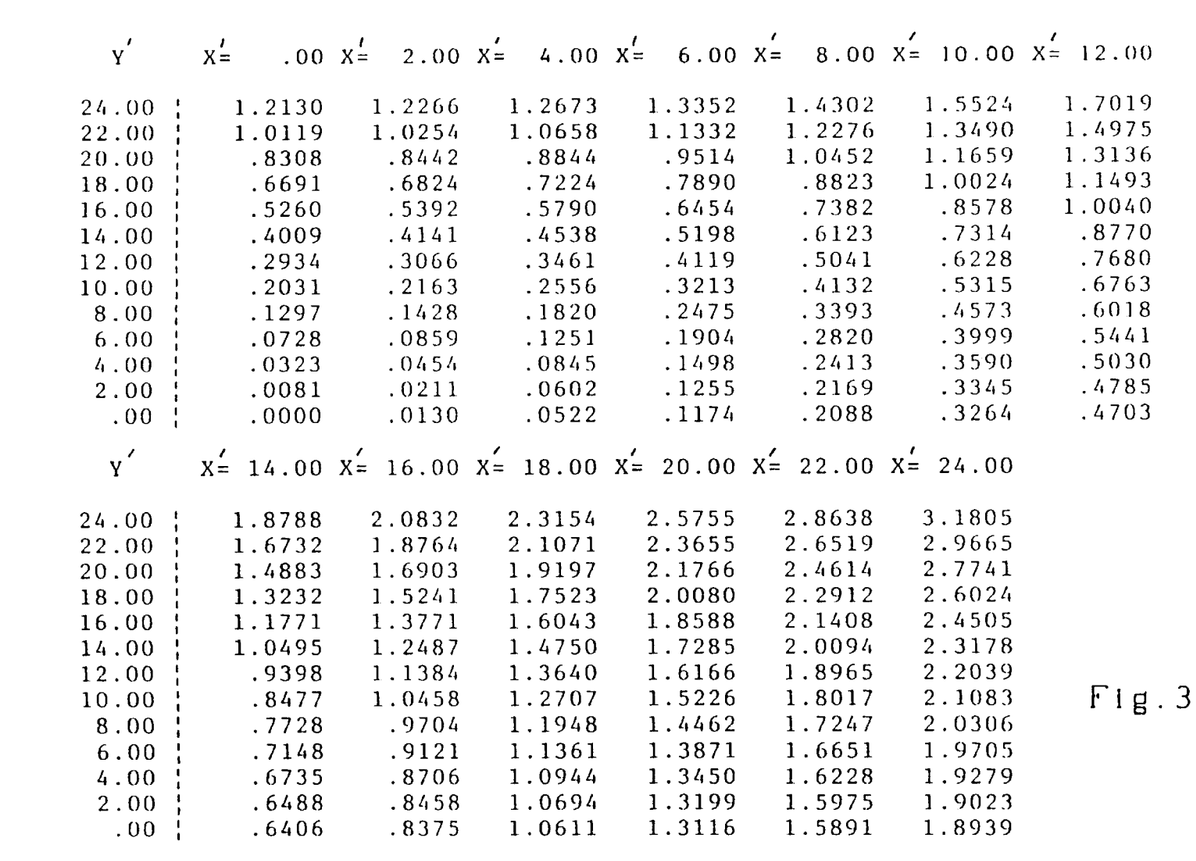

FIG. 3 shows the sagittas of the surfaces employed in FIG. 2 designed according to the present invention having two symmetrical planes. Sagitta is understood to be the distance of one point having the coordinates x' and y' of one plane, which touches the astigmatic surface at the apex. Different than in FIGS. 1 and 2, the coordinate system x' and y' here is not a system related to the use position, but rather a coordinate system whose x-and y-axes lie in the symmetrical planes of the astigmatic surface. Therefore, the sagitta of a quadrant, notably the quadrant having the coordinates x'=0 . . . 24 and y'=0 . . . 24 (mm), is sufficient.

In the preceding the invention has been made apparent using a preferred embodiment without the intention of limiting the spirit or scope of the overall inventive idea. In particular, the inventive fundamental concept can be applied to astigmatic surfaces which have only one or no symmetrical plane.

What is claimed is:

1. An ophthalmic lens comprising:

a first surface provided with at least one region, in which the refracting power is practically constant except for aspherical corrections, and at least one transition region which is adjacent to said region having practically constant surface refracting power, and in which the refracting power of said transition region increases or decreases continuously; and a second surface provided with an astigmatic effect to correct for astigmatic aberration, with the orientation of said second surface having an astigmatic effect relative to said first surface having continuous refracting power change being dependent on the position of the axis of the astigmatism of the eye;

wherein said second surface having an astigmatic effect has a design which deviates from a toric shape, and said second surface having an astigmatic effect, independent of the orientation of said second surface relative to said first surface, is a surface which is optimized for the axial position of 0°;

wherein said second surface having an astigmatic effect is optimized for two viewing cones; and wherein one of said two viewing cones corresponds to a vision excursion of approximately 15–20° and the other of said two viewing cones corresponds to a vision excursion of approximately 30–40°.

2. An ophthalmic lens according to claim 1, wherein said second surface having an astigmatic effect having at least one main portion the shape of which is not circular.

3. An ophthalmic lens according to claim 1, wherein no portion of said surface having an astigmatic effect, which runs through the apex, has a circular shape.

4. An ophthalmic lens according to claim 1, wherein said second surface having an astigmatic effect has two main portions which are in symmetrical planes.

5. An ophthalmic lens according to claim 4, wherein said second surface having an astigmatic effect is optimized with a counter surface having a practically constant astigmatic effect providing a practically constant astigmatic aberration correction.

6. An ophthalmic lens according to claim 1, wherein at least a plane of one main portion of said second surface having an astigmatic effect is not in a symmetrical plane.

7. An ophthalmic lens according to claim 6, in which the first surface is provided in an upper region a region suitable for distance vision or for near vision and in a lower region a region suitable for near vision or distance vision and between said regions said transition region having continuously changing refracting power, and wherein in the optimization along the viewing cones viewing points in the distance and near region have greater effect on the optimization than in a lateral region.

8. An ophthalmic lens according to claim 7, in which said first surface is provided in an upper region a region suitable for distance vision or for near vision and in a lower region a region suitable for near vision or distance vision and between said regions said transition region, and wherein in said optimization along said viewing cones said viewing points in the distance and near region being considered separately according to the respective range of vision.

* * * * *